Jan. 29, 1946. J. B. BARRETT 2,393,733
REEL
Filed Oct. 13, 1943
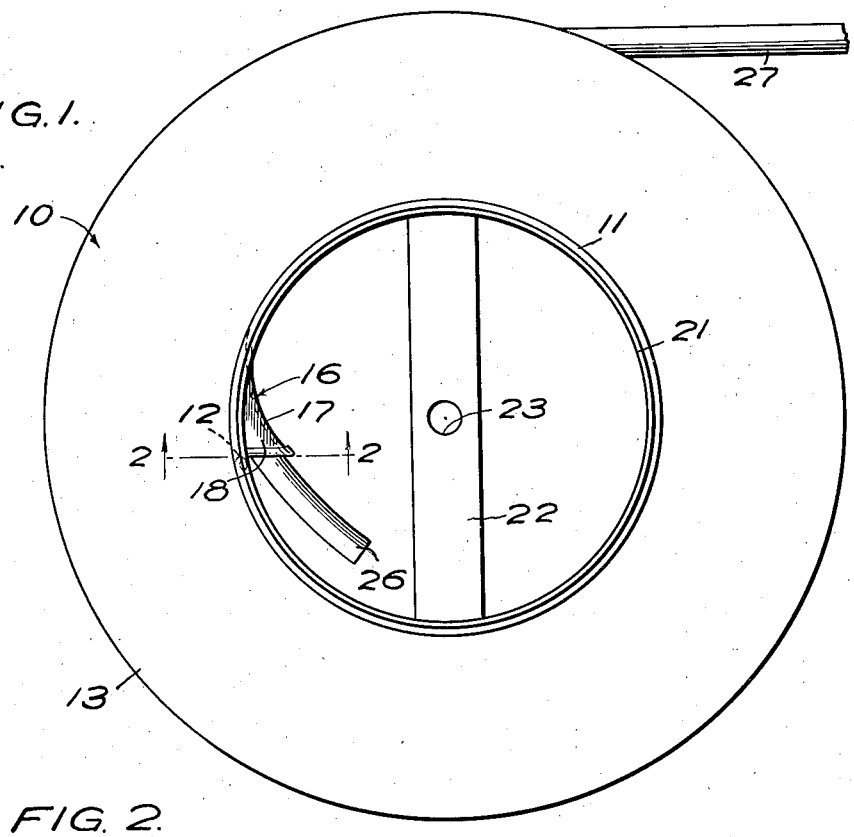
FIG. 1.
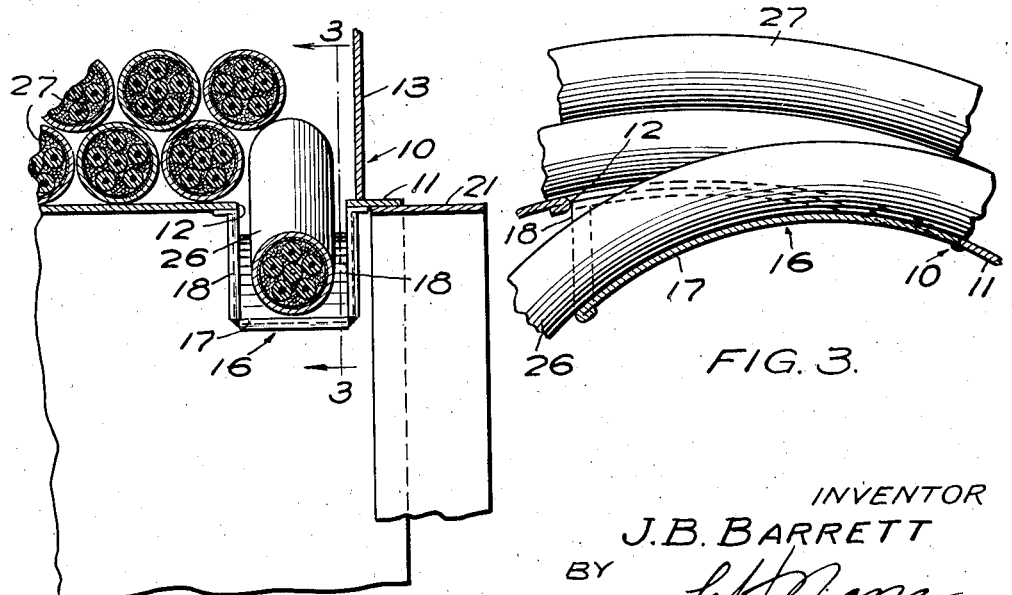
FIG. 2.
FIG. 3.
INVENTOR
J. B. BARRETT
BY
ATTORNEY Patented Jan. 29, 1946

2,393,733

UNITED STATES PATENT OFFICE 2,393,733

REEL

James Barton Barrett, Baltimore, Md., assignor to Western Electric Company, Incorporated, New York, N. Y., a corporation of New York Application October 13, 1943, Serial No. 506,057

3 Claims. (Cl. 242—77)

This invention relates to reels and has for its object new and improved reels.

Reels heretofore known for storage and transportation of cables have had openings cut in one face of the reel head at about the point where the drum intersects the reel head through which the inner ends of cables coiled thereon have been passed to provide ready access to those ends for testing and other purposes. When these reels having cables coiled thereon were rolled in the transportation thereof or when the cables were unreeled therefrom, the cables tended to creep on the reel drums, and frequently the inner ends of the cables were advanced through the openings distances of several feet. Thus, the projecting ends of the cables were exposed and often were damaged. In addition, these ends sometimes interfered with the unreeling operations.

One cable reel embodying the invention comprises reel heads, a drum extending therebetween, which drum is provided with an opening in the periphery thereof adjacent to one of the heads, and a tapered spout extending from the opening to a point within the drum, whereby the inner end of a cable is guided in a spiral within the drum whenever it is forced through the opening by an unreeling operation.

A complete understanding of the invention may be obtained from the following detailed description of a specific embodiment of the invention, when read in conjunction with the appended drawing, in which Fig. 1 is a side elevation of a reel embodying the invention;

Fig. 2 is a fragmentary view in partial section taken on line 2—2 of Fig. 1, and Fig. 3 is a fragmentary sectional view taken on line 3—3 of Fig. 2.

Referring to the drawing, a reel 10 comprises a drum 11 having an aperture 12 formed in the periphery thereof adjacent to a reel head 13 which is secured upon the drum. A second reel head (not shown), similar to the head 13, is secured upon the other end of the drum 11. A spout 16 consists of a plate 17 secured in and slanting toward the interior of the drum from the aperture 12 and generally triangular sides 18—18 welded to the inner periphery of the drum and to the plate 17.

The drum 11 may be mounted upon a pair of rims of a type illustrated by rim 21, wedged into the interior of the drum 11. A cross-bar 22 having an aperture 23 formed therein is secured transversely across the rim 21. The aperture 23 is adapted to receive an axle (not shown), upon which the reel 10 may be mounted for rotation thereon.

An inner end 26 of a cable 27 which is coiled upon the reel 10 is guided through the aperture 12 and the spout 16 when the cable is wound upon the reel. The end projects into the interior of the drum 11 and is conveniently located for testing operations. Also, when the reel is rotated in a clockwise direction as viewed in Fig. 1 of the drawing, if the inertia of the coiled cable causes it to lag behind the rotation of the reel and thereby force the end 26 of the cable farther through the spout 16, the end will remain within the interior of the drum and will not be subjected to damage during storage or unreeling operations. Consequently, a substantial saving by prevention of damage to the ends of cables, by storing the cables on reels embodying the invention, may be effected.

What is claimed is:

1. A reel for holding electrical cables, which comprises a pair of reel heads, a hollow drum to which the heads are secured and which has a rectangular opening formed in the periphery thereof, said drum also being provided with a smooth exterior periphery, a plate positioned within the drum with an end thereof abutting and secured to one edge of the opening in the drum, and a pair of generally triangular shaped plates positioned within the drum and secured to the interior portion of the drum and to the first mentioned plate to form a spout by which the inner end of a cable wound on the drum may be directed toward the interior of the drum.

2. A reel for holding electrical cables, which comprises a hollow drum having an opening in the periphery adjacent to an end thereof, a pair of annular reel heads secured to the ends of the drum, a curved plate secured to the drum with an end thereof abutting an edge of the opening in the drum and extending into the interior of the drum for supporting an end of a cable coiled on the drum and extended through the opening and into the interior of the drum, and a pair of generally triangular plates secured to the curved plate and the portions of the drum adjacent to the edges of the opening for preventing lateral displacement of the end of the cable supported by the curved plate.

3. A reel for holding electrical cables, which comprises a pair of reel heads, a hollow drum to which the heads are secured and which has an opening in the periphery thereof, said drum also being provided with a smooth exterior periphery, a plate positioned within the drum with an end thereof abutting and secured to one edge of the opening in the drum, and a pair of plates positioned within and secured to the drum in positions adjacent to the opening and secured to the first-mentioned plate for forming therewith a spout by which the inner end of a cable wound on the drum may be directed toward the interior of the drum.

JAMES BARTON BARRETT.